US008699824B2

(12) United States Patent
Cheng et al.

(10) Patent No.: US 8,699,824 B2
(45) Date of Patent: Apr. 15, 2014

(54) METHOD, APPARATUS AND COMPUTER PROGRAM PRODUCT FOR PROVIDING MULTI-FEATURE BASED SAMPLING FOR RELEVANCE FEEDBACK

(75) Inventors: Jian Cheng, Beijing (CN); Kongqiao Wang, Beijing (CN); Jari A. Kangas, Tampere (FI)

(73) Assignee: Nokia Corporation, Espoo (FI)

(\*) Notice: Subject to any disclaimer, the term of this patent is extended or adjusted under 35 U.S.C. 154(b) by 1765 days.

(21) Appl. No.: 11/617,310

(22) Filed: Dec. 28, 2006

(65) Prior Publication Data

US 2008/0163087 A1     Jul. 3, 2008

(51) Int. Cl.
*G06K 9/60* (2006.01)
*G06K 9/62* (2006.01)
*H04N 1/21* (2006.01)
*G06F 17/30* (2006.01)

(52) U.S. Cl.
CPC ............ *G06K 9/6262* (2013.01); *G06K 9/6263* (2013.01); *G06K 9/62* (2013.01); *G06K 9/6202* (2013.01); *G06K 9/6212* (2013.01); *G06K 9/6215* (2013.01); *G06K 9/6217* (2013.01); *G06K 9/6228* (2013.01); *G06K 9/623* (2013.01); *G06K 9/6231* (2013.01); *G06K 9/6232* (2013.01); *G06K 9/6261* (2013.01); *G06K 9/6267* (2013.01); *H04N 1/2166* (2013.01); *G06F 17/30047* (2013.01); *G06F 17/30023* (2013.01)
USPC ........... 382/305; 382/209; 382/224; 382/225; 382/226; 382/227

(58) Field of Classification Search
USPC ................................. 382/305, 209, 224–227
See application file for complete search history.

(56) References Cited

U.S. PATENT DOCUMENTS

| 2002/0028021 | A1* | 3/2002 | Foote et al. ................... 382/224 |
| 2003/0016250 | A1 | 1/2003 | Chang et al. |
| 2003/0033300 | A1* | 2/2003 | Bergman et al. .................. 707/5 |

OTHER PUBLICATIONS

M. L. Kherfi et al, Learning from Negative Example in Relevance Feedback for Content-Based Image Retrieval, IEEE 2002.*
Mark J. Juiskes, Aspect-Based Relevance Learning for Image Retrieval, CIVR 2005.*
M.L. Kherfi et al, Combining positive and negative examples in relevance feedback for content-based image retrieval, Elsevier 2003.*
Pengyu Hong, Qi Tian, Thomas S. Huang; *Incorporate Support Vector Machines to Content-Based Image Retrieval with Relevant Feedback*; 2000; 7th IEEE International Conference on Image Processing.

(Continued)

*Primary Examiner* — Chan Park
*Assistant Examiner* — Mark Roz
(74) *Attorney, Agent, or Firm* — Alston & Bird LLP

(57) ABSTRACT

An apparatus for providing multi-feature based sampling for relevance feedback may include a user interface element. The user interface element may be configured to receive a query image, provide a first set of images determined to be relevant with respect to the query image, and provide a second set of images in which each image of the second set of images comprises a first relevance determination with respect to a first feature of an image and a second relevance determination for at least a second feature of the image. Each image of at least the second set of images may include an associated user interface item to enable a user to provide relevance feedback with respect to each image of the second set of images.

24 Claims, 7 Drawing Sheets

(56) References Cited

OTHER PUBLICATIONS

Abe, N. et al., *Query Learning Using Boosting and Bagging,* Proceedings of International Conference on Machine Learning (ICML'98) (1998) 1-9.

Blum, A. et al., *Combining Labeled and Unlabeled Data With Co-Training,* Proceedings of the 11th Annual Conference on Computational Learning Theory (1998) 92-100.

Muslea, I. et al., *Selective Sampling with Redundant Views,* Proceedings of the 17th National Conference on Artificial Intelligence (2000) 621-626.

Picard, R. W. et al., *Modeling User Subjectivity in Image Libraries,* Proceedings of International Conference on Image Processing (1996), 4 pp.

Rui, Y. et al., *Content-Based Image Retrieval With Relevance With Feedback in MARS,* Proceedings of the IEEE International Conference on Image Processing (1997), pp. 815-818.

Rui, Y. et al., *Image Retrieval: Current Techniques, Promising Directions and Open Issues,* Journal of Visual Communication and Image Representation, vol. 10 (1999) 39-62.

Seung, H. et al., *Query by Committee,* Proceedings of COLT'72 (1972) 287-294.

Smeulders, A. W. M. et al., *Content-Based Image Retrieval at the End of the Early Years,* IEEE Transactions on Pattern Analysis and Machine Itelligence, vol. 22, No. 12 (2000) 1349-1380.

Tieu, K. et al., *Boosting Imaging Retrieval,* Proceeding of IEEE Conference on Computer Vision and Pattern Recognition (2000), International Journal of Computer Vision 56 (1/2) (2004) pp. 17-36.

Tong, S. et al., *Support Vector Machine Active Learning for Image Retrieval.* Proceedings of the 9th ACM Conference on Multimedia (2001) 107-118.

Veltkamp, R. C. et al., *Content-Based Image Retrieval Systems: A Survey,* [online] [retrieved Oct. 10, 2013]. Retrieved from the Internet: <URL: http://give-lab.cs.uu.nl/cbirsurvey/cbir-survey.pdf>. (Oct. 28, 2002) 62 pages.

Zhou, Z. et al., *Exploiting Unlabeled Data in Content-Based Image Retrieval,* Proceedings of the 15th European Conference on Machine Learning (ECML '04) (2004) 525-536.

Zhou, x. S. et al., *Small Sample Learning During Multimedia Retrieval Using BiasMap,* Proceeding of IEEE Conference on Computer Vision and Pattern Recognition (2001), 11 pp.

\* cited by examiner

METHOD, APPARATUS AND COMPUTER PROGRAM PRODUCT FOR PROVIDING MULTI-FEATURE BASED SAMPLING FOR RELEVANCE FEEDBACK

TECHNOLOGICAL FIELD

Embodiments of the present invention relate generally to content retrieval technology and, more particularly, relate to a method, apparatus and computer program product for providing multi-feature based sampling for relevance feedback in content retrieval.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information retrieval in networks. For example, information such as audio, video, image content, text, data, etc., may be made available for retrieval between different entities using various communication networks. Accordingly, devices associated with each of the different entities may be placed in communication with each other to locate and affect a transfer of the information.

In certain situations, for example, when a user wishes to retrieve image content from a particular location such as a database, the user may wish to review images based on their content. In this regard, for example, the user may wish to review images of cats, animals, cars, etc. Although some mechanisms have been provided by which metadata may be associated with content items to enable a search for content based on the metadata, insertion of such metadata may be time consuming. Additionally, a user may wish to find content in a database in which the use of metadata is incomplete or unreliable. Accordingly, content based image retrieval (CBIR) solutions have been developed which utilize, for example, a support vector machine (SVM) to classify content based on its relevance with respect to a particular query. Thus, for example, if a user desires to search a database for images of cats, a query image could be provided of a cat and the SVM could search through the database and provide images to the user based on their relevance with respect to the features of the query image.

However, CBIR often classifies images based on low-level features such as color, shape, texture, etc. Accordingly, the boundary between relevance and irrelevance may not be highly refined. In an effort to improve CBIR performance, the concept of relevance feedback was developed. Relevance feedback relates to providing feedback to the SVM regarding images presented as to the relevance of the images. The assumption is that given the relevance feedback, the SVM may better learn the classification boundary between relevant and irrelevant images. However, providing relevance feedback can also become a tedious operation if too much feedback is required to develop an effective classification boundary.

Accordingly, it may be advantageous to provide an improved method of providing relevance feedback, which may overcome the disadvantages described above.

BRIEF SUMMARY

A method, apparatus and computer program product are therefore provided to enable efficient provision of relevance feedback. In particular, a method, apparatus and computer program product are provided that provide multi-feature based sampling for relevance feedback in image retrieval. For example, many images, particularly those that are highly relevant or highly irrelevant, may provide little useful information for determining the classification boundary between relevance and irrelevance. Thus, embodiments of the present invention may provide for selection of images which are most useful in determining the classification boundary for presentation to the user for relevance feedback. Accordingly, a user may be enabled to efficiently define the classification boundary with less feedback since the feedback provided will carry a greater importance in determining the classification boundary. Accordingly, the efficiency of image content retrieval may be increased and content management for electronic devices such as mobile terminals may be improved.

In one exemplary embodiment, a method of providing multi-feature based sampling for relevance feedback is provided. The method may include receiving a query image, providing a first set of images determined to be relevant with respect to the query image, and providing a second set of images in which each image of the second set of images comprises a first relevance determination with respect to a first feature of an image and a second relevance determination for at least a second feature of the image. Each image of at least the second set of images may include an associated user interface item to enable a user to provide relevance feedback with respect to each image of the second set of images.

In another exemplary embodiment, a computer program product for providing multi-feature based sampling for relevance feedback is provided. The computer program product includes at least one computer-readable storage medium having computer-readable program code portions stored therein. The computer-readable program code portions include first, second, and third executable portions. The first executable portion is for receiving a query image. The second executable portion is for providing a first set of images determined to be relevant with respect to the query image. The third executable portion is for providing a second set of images in which each image of the second set of images comprises a first relevance determination with respect to a first feature of an image and a second relevance determination for at least a second feature of the image. Each image of at least the second set of images may include an associated user interface item to enable a user to provide relevance feedback with respect to each image of the second set of images.

In another exemplary embodiment, an apparatus for providing multi-feature based sampling for relevance feedback is provided. The apparatus may include a user interface element. The user interface element may be configured to receive a query image, provide a first set of images determined to be relevant with respect to the query image, and provide a second set of images in which each image of the second set of images comprises a first relevance determination with respect to a first feature of an image and a second relevance determination for at least a second feature of the image. Each image of at least the second set of images may include an associated user interface item to enable a user to provide relevance feedback with respect to each image of the second set of images.

In another exemplary embodiment, an apparatus for providing multi-feature based sampling for relevance feedback is provided. The apparatus includes means for receiving a query image, means for providing a first set of images determined to be relevant with respect to the query image and means for providing a second set of images in which each image of the second set of images comprises a first relevance determination with respect to a first feature of an image and a second relevance determination for at least a second feature of the image. Each image of at least the second set of images may include an associated user interface item to enable a user to provide relevance feedback with respect to each image of the second set of images.

Embodiments of the invention may provide a method, apparatus and computer program product for employment in devices to enhance content retrieval such as image content retrieval. As a result, for example, mobile terminals and other electronic devices may benefit from an ability to perform content retrieval in an efficient manner without suffering from excessive requirements for provision of relevance feedback.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
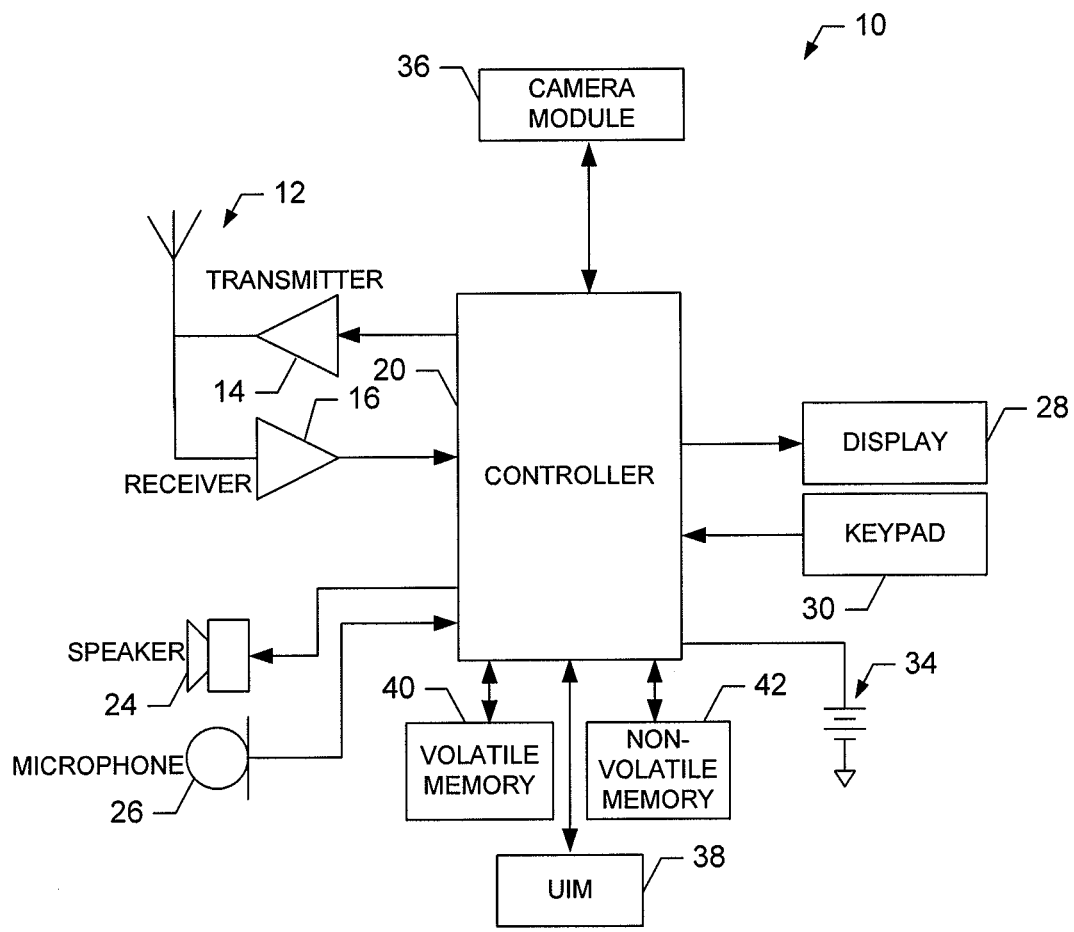
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols or the like.

It is understood that the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
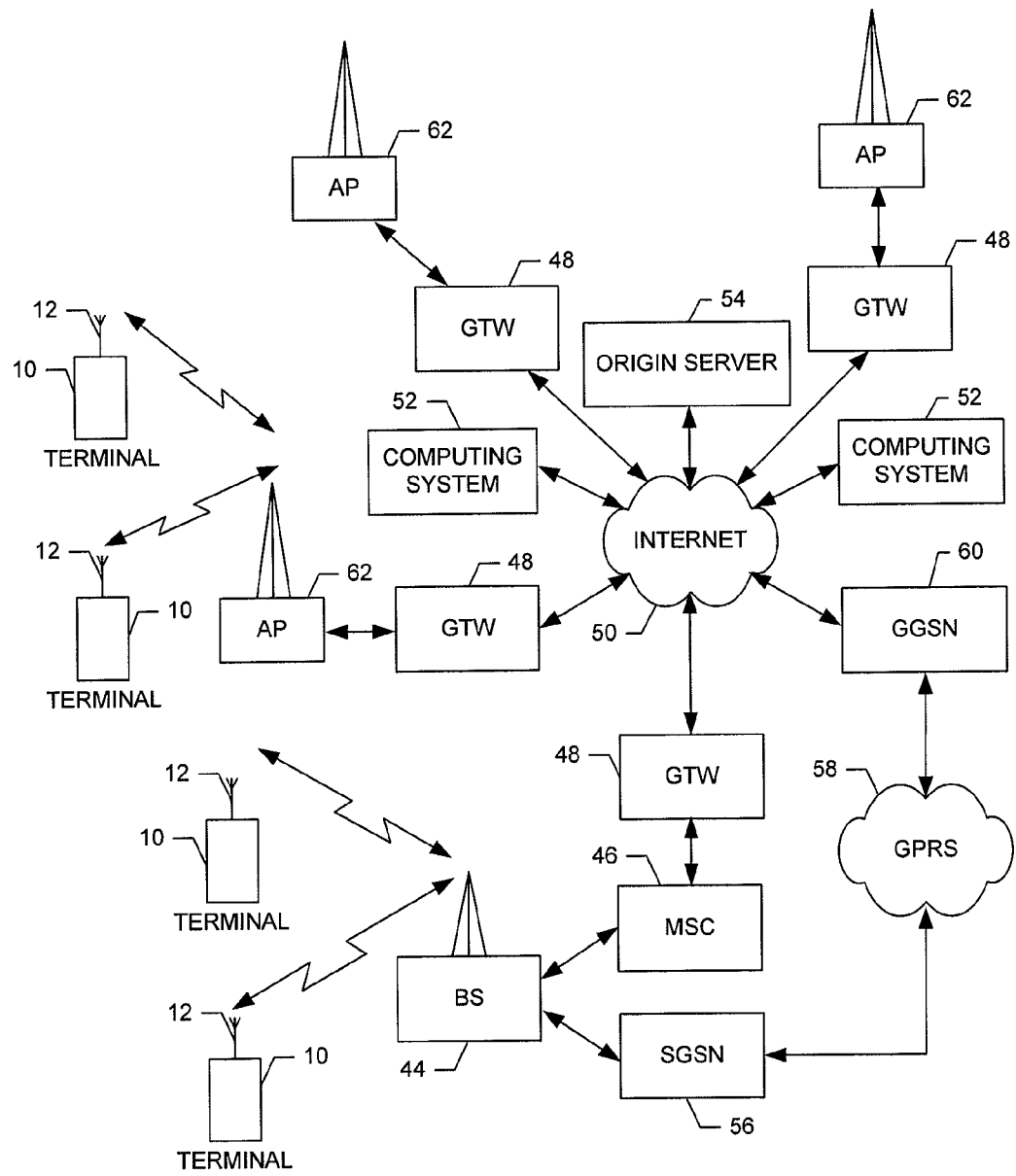
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX, UWB techniques and/or the like.

In an exemplary embodiment, content such as image content may be communicated over the system of FIG. 2 between a mobile terminal, which may be similar to the mobile terminal 10 of FIG. 1 and a network device of the system of FIG. 2, or between mobile terminals. For example, a database may store the content at a network device of the system of FIG. 2, and the mobile terminal 10 may desire to search the content for a particular type of content. However, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, or may be resident on a network device or other device accessible to the communication device.

Figure 3:
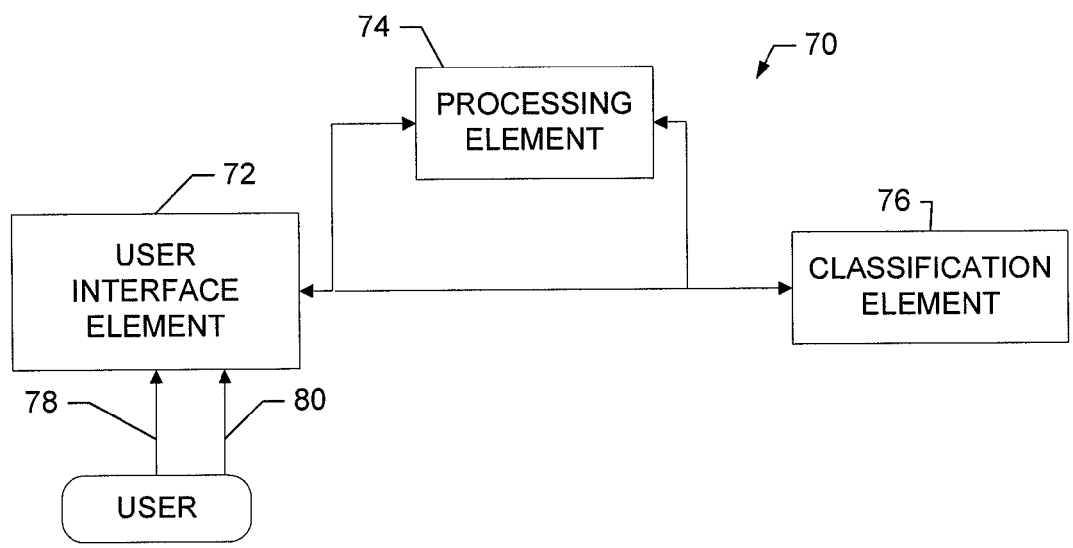
FIG. 3 illustrates a block diagram of an apparatus for providing multi-feature based sampling for relevance feedback according to an exemplary embodiment of the present invention.

FIG. 3 illustrates a block diagram of an apparatus for providing multi-feature based sampling for relevance feedback according to an exemplary embodiment of the present invention. The system of FIG. 3 will be described, for purposes of example, in connection with the mobile terminal 10 of FIG. 1. However, it should be noted that the apparatus of FIG. 3 may also be employed in connection with a variety of other devices, both mobile and fixed, and therefore, embodiments of the present invention should not be limited to application on devices such as the mobile terminal 10 of FIG. 1. In fact, embodiments may also be practiced in the context of a client-server relationship in which the client issues a query to the server and the server practices embodiments of the present invention and communicates results to the client. It should also be noted, that while FIG. 3 illustrates one example of a configuration of an apparatus for providing multi-feature based sampling for relevance feedback, numerous other configurations may also be used to implement embodiments of the present invention.

Referring now to FIG. 3, an apparatus 70 for providing multi-feature based sampling for relevance feedback is provided. The apparatus 70 may include a user interface element 72, a processing element 74 and a classification element 76. In an exemplary embodiment, the processing element 74 could be embodied as the controller 20 of the mobile terminal 10 of FIG. 1. Although, as stated above, the processing element 74 could alternatively be a processing element of a different device. Processing elements as described herein may be embodied in many ways. For example, the processing element 74 may be embodied as a processor, a coprocessor, a controller or various other processing means or devices including integrated circuits such as, for example, an ASIC (application specific integrated circuit).

The user interface element 72 may be any device or means embodied in either hardware, software, or a combination of hardware and software that is capable of receiving user inputs and/or providing an output to the user. The user interface element 72 may include, for example, a keyboard, keypad, function keys, mouse, scrolling device, touch screen, or any other mechanism by which a user may interface with the apparatus 70. The user interface element 72 may also include a display, speaker or other output mechanism for providing user output to the user. In an exemplary embodiment, rather than including a device for actually receiving the user input and/or providing the user output, the user interface element 72 could be in communication with a device for actually receiving the user input and/or providing the user output. As such, the user interface element 72 may be configured to receive indications of the user input from an input device and/or provide messages for communication to an output device.

In an exemplary embodiment, the user interface element 72 may be configured to receive indications of a query 78 from the user. The query 78 may be, for example, an image containing content providing a basis for a content based image retrieval (CBIR) operation. The query 78 may have been an image (e.g., a query image) acquired by any method. For example, the query 78 could be an image that was acquired from a database, from a memory of the device providing the query 78, from an image acquired via the camera module 36, etc. In other words, the query 78 could be a previously existing image or a newly created image according to different exemplary embodiments.

The user interface element 72 may also be configured to receive relevance feedback such as image feedback 80 from the user. In this regard, for example, the classification element 76 may initially provide image classification data with respect to a set of images based on the query 78 as described in greater detail below. After provision of the image classification data to the user, the user may be enabled to enter image feedback 80 (e.g., via the user interface element 72) with respect to a selected portion of the set of images as also described in greater detail below. The image feedback 80 may provide an input to the classification element 76 for application in re-classifying the set of images. In an exemplary embodiment, the image feedback 80 is provided by the user for a sampling set used for training a boundary between classes of images (e.g., relevant/irrelevant classes). The process of receiving the image feedback 80 and re-classifying images may be referred to as a relevance feedback process.

The classification element 76 may be any device or means embodied in either hardware, software, or a combination of hardware and software that is capable of performing image classification. In an exemplary embodiment, the classification element 76 may be configured to perform a similarity measure with respect to a query image (e.g., the query 78) and a set of images, such as images within a database, and return a set of relevant images in similarity order. In this regard, the classification element 76 may be configured to, for example, compare multiple features such as low-level features of the query 78 to corresponding multiple features of the set of images to provide a classification in terms of relevance with respect to each of the images within the set of images. The classification element 76 may be further configured to receive the image feedback 80 and re-classify the set of images based on the image feedback 80 as described in greater detail below. Furthermore, any number of iteration of receiving the image feedback 80 and updating the set of images may be performed. As described below, the classification element 76 may utilize features associated with the query 78 in order to learn to classify images with respect to relevance based on their similarity to features of the query 78 and thereafter receive feedback, which may be utilized to refine or better learn a classification boundary between relevant and irrelevant images.

Figure 4:
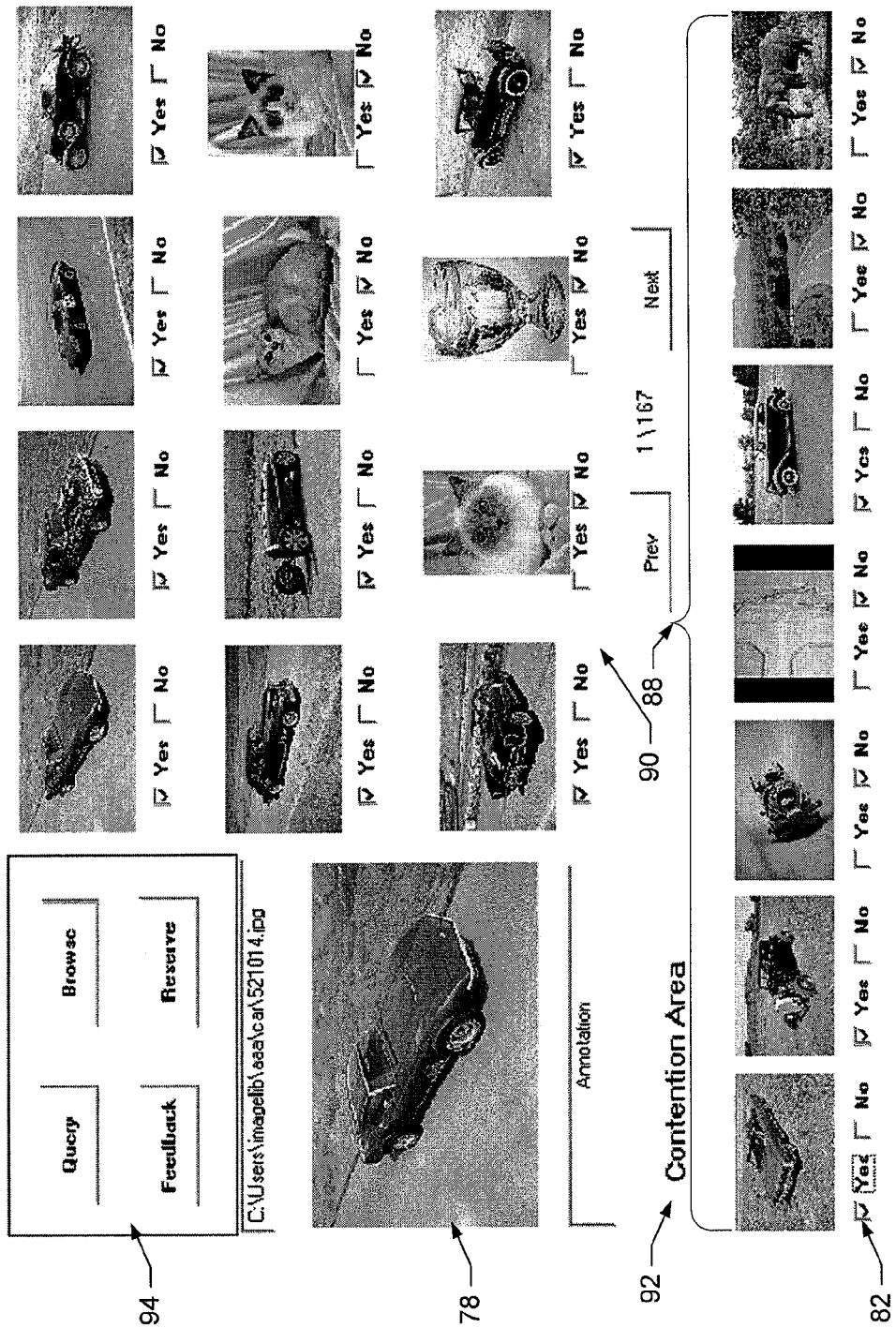
FIG. 4 illustrates an example of a display of images in response to a content based image retrieval operation for a query image according to an exemplary embodiment of the present invention.

However, learning the classification boundary between relevant and irrelevant images based only on the query 78 may not always result in correct classification results. Accordingly, some images may be returned as a result of the CBIR operation, which are not relevant. FIG. 4 illustrates an example of a display of images in response to a CBIR operation for a query image comprising a car. In general, images returned as a result of the similarity measure initially performed are presented in order of similarity. Accordingly, if the query 78 is obtained from a searched database, the image corresponding to the query 78 will be the first image returned (i.e., the most relevant image). As can be seen from FIG. 4, performance of the CBIR operation responsive to only the query 78 may provide some images which are seen as being relevant, but which may not actually be relevant. According to conventional procedures, the user may be offered a display including a user interface item 82 associated with each image, which may be utilized to provide the image feedback 80 for use in better learning the classification boundary. However, some images may provide more useful information to assist in better learning the classification boundary than others. For example, for a particular feature (e.g., size, shape, color, texture, etc.) those images that are nearest the classification boundary between relevance and irrelevance may tend to provide more useful information in defining the classification boundary than images which are nearer edges of a feature space plot (e.g., images that are very relevant or irrelevant).

Figure 5:
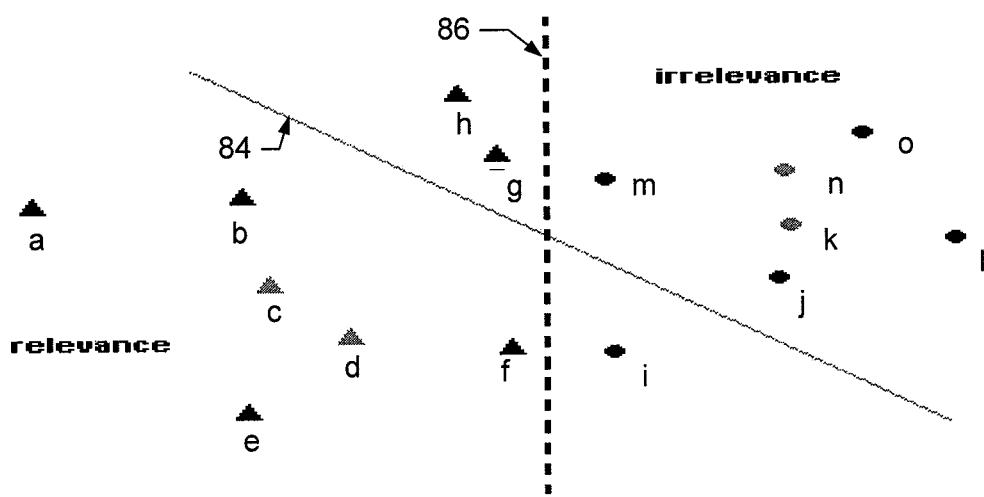
FIG. 5 illustrates a feature space plot indicating a mapping of several images in feature space according to their relevance for a particular feature.

FIG. 5 illustrates a feature space plot indicating a mapping of several images in feature space according to their relevance for a particular feature. According to FIG. 5, triangle shapes (a through i) represent images that are relevant to a query image and circle shapes (j through o) represent images that are irrelevant to the query image. In FIG. 5, a solid line represents a classification boundary 84 learned by the classification element 76, while a dashed line represents an actual boundary 86. According to conventional procedures, the user may be provided with an opportunity to provide feedback for some or even all of the images (a though o). However, those images near the edges (e.g., image a and image e for relevant images and image o and image l for irrelevant images) may provide less useful information with regard to relearning the classification boundary 84. However, images closer to the classification boundary 84 (e.g., images g, h, f, i, and m) may provide more useful information with regard to relearning the classification boundary 84. Thus, according to exemplary embodiments of the present invention, rather than being provided with an ambiguous listing of images which the user may utilize for providing feedback regarding the classification boundary 84, the user may instead be presented, via the user interface element 72, with a subset of images selected as being more useful in relearning the classification boundary 84. The subset of images may be images which are generally ambiguous with respect to their classification in some way and may, therefore, be located proximate to the actual boundary 86. In an exemplary embodiment, the subset of images (which may be referred to as outlier images) may be selected as images which are relevant according to one feature classification and irrelevant according to another. For example, if an image is classified as being relevant according a first feature (e.g., color) and irrelevant according to a second feature (e.g., texture), the image may be selected as an outlier image and provided to the user as such so that the user may be enabled to provide image feedback 80 (i.e., relevance feedback) with respect to the outlier image. Thus, the user may choose to provide feedback only for those images most likely to positively impact the classification element 76 in its ability to learn the classification boundary 84 more accurately (e.g., such as the outlier images).

As shown in FIG. 4, a subset of images 88 (e.g., outlier images) may be displayed in a separate portion of the display. In other words, the display of FIG. 4 may include a first portion 90 for displaying some or all of the images selected as being relevant, and a second portion 92 for displaying at least a portion of the subset of images 88. As shown in FIG. 4, the second portion 92 may be labeled "Contention Area" indicating that images in the subset of images 88 are ambiguous in terms of their classification since each of the subset of images 88 may include a first relevance determination with respect to a first feature of the corresponding one of the subset of images 88 and a second relevance determination (e.g., opposite of the first relevance determination) for at least a second feature. However, any suitable label, or even no label, may be provided.

As shown in FIG. 4, each image may include the user interface items 82 for enabling the user to select whether (or to what degree) the corresponding image is relevant to the query 78. Although the user may select user interface items 82 for any image, displaying at least the subset of images 88 provides the user with a targeted group of images for which the user may provide image feedback 80, which may be more useful in determining the classification boundary 84 than would be provided by images within the first portion 90. Thus, the user may be informed as to which images may be more likely to provide more useful feedback.

FIG. 4 also illustrates function buttons 94, which may be employed to provide user instructions to the apparatus 70. In an exemplary embodiment, the function buttons 94 may include a query button which may be used to enable selection of a query image such as the query 78. The function buttons 94 may also include a browse button which may enable the user to browse through various storage locations, for example, for selecting an image to designate as the query 78. A feedback button may also be provided for invoking communication of the image feedback 80 to the classification element 76 in order to update the classification boundary 84 and re-present relevant images based on changes learned responsive to receipt of the image feedback 80. Other buttons may also be provided.

Figure 6:
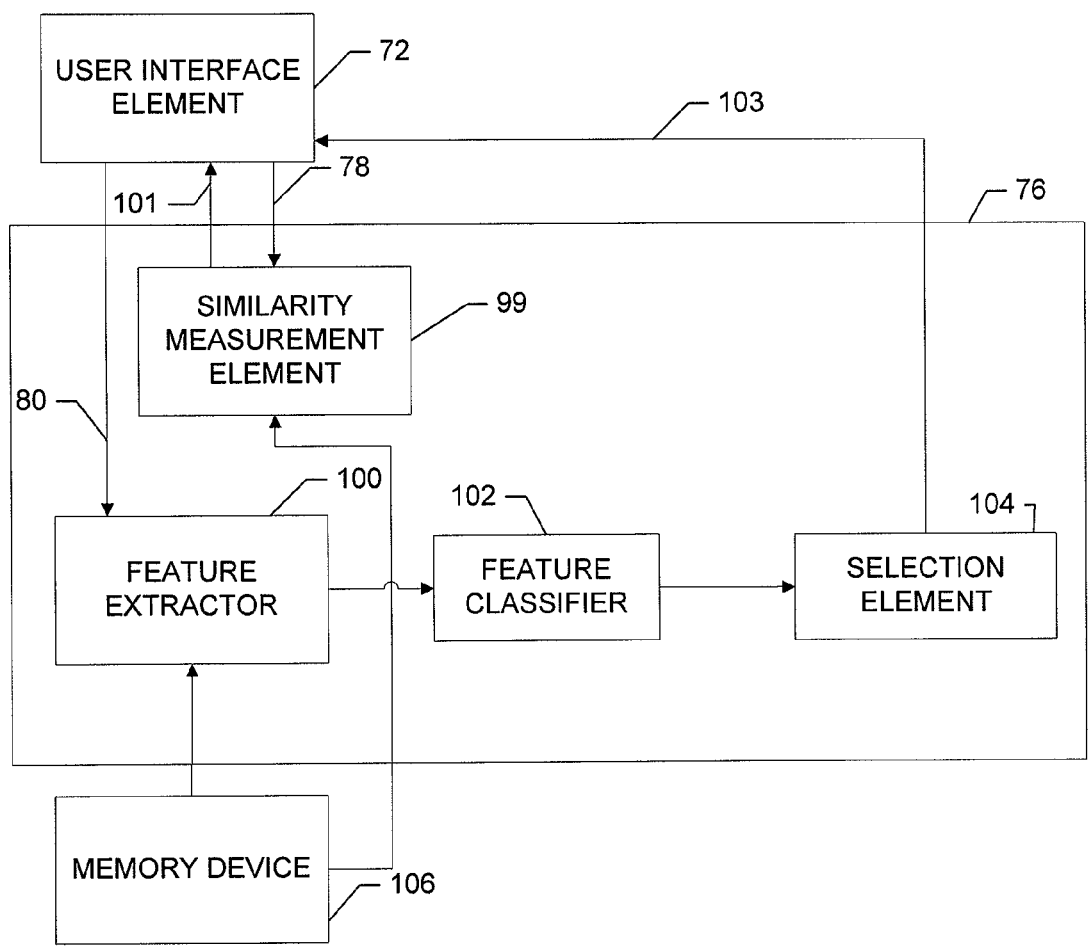
FIG. 6 illustrates a block diagram of image classification results using the classification element according to an exemplary embodiment of the present invention.

FIG. 6 illustrates a block diagram of image classification results using the classification element 76 according to an exemplary embodiment of the present invention. In this regard, classification element 76 may include a similarity measurement element 99, a feature extractor 100, a feature classifier 102 and a selection element 104. Each of the similarity measurement element 99, the feature extractor 100, the feature classifier 102 and the selection element 104 may operate under the control of or otherwise be embodied as a processing element (e.g., the processing element 74).

The similarity measurement element 99 may be any device or means embodied in either hardware, software, or a combination of hardware and software that is capable of performing a similarity measure between two images. In particular, the similarity measurement element 99 may be configured to perform an initial relevance determination based on similarity between a query image (e.g., the query 78) and each separate image of a search database such as a memory device 106. The similarity measurement element 99 may be configured to return the separate images for presentation to the user in order of similarity as initial relevance data 101. In this regard, the similarity measurement element 99 may provide an initial determination of the classification boundary 84 between relevant and irrelevant images based on similarity between images.

The feature extractor 100 may be any device or means embodied in either hardware, software, or a combination of hardware and software that is capable of extracting feature vectors from a given image for communication of the feature vectors to the feature classifier 102. Features which the feature extractor 100 may be configured to extract may include data regarding, for example, color, size, shape, texture (e.g., frequency information in the horizontal, vertical and diagonal directions) of the image. Accordingly, the feature classifier may be in communication with the memory device 106, which may, for example, be in communication with the apparatus 70 via the system of FIG. 2. However, the memory device 106 could be any storage location accessible to the classification element 76. The memory device 106 may store one or more databases of images which could be browsed for selection of the query 78 or which may be parsed by the feature extractor 100 for the extraction of feature vectors from the images therein. The feature vectors associated with each image for each corresponding feature may then be communicated to the feature classifier 102.

The feature classifier 102 may be any device or means embodied in either hardware, software, or a combination of hardware and software that is capable of providing feedback images 103 in response to relearning the classification boundary 84 based on the image feedback 80. Accordingly, the feature classifier 102 may be configured to produce a relevance determination for the image with respect to each feature. Determinations made by the feature classifier 102 may then be communicated to the selection element 104. In an exemplary embodiment, the feature classifier 102 may be a support vector machine (SVM) or other linear classifier which may, for example, be configured to perform supervised learning for the performance of regression and/or classification. In this regard, the feature classifier 102 may be an SVM that is a two-class classifier, which creates an optimized boundary dividing given images into two classes (e.g., relevant/irrelevant) so that the margin between the two classes may be maximized.

In an exemplary embodiment, the feature classifier 102 may be configured to train a boundary in feature space with respect to each feature and classify the image with respect to the trained boundary. Upon receipt of relevance feedback, the feature classifier 102 may update the boundary. In either case, once the boundary is determined, images may be classified as relevant or irrelevant for a given feature based on their location in feature space relative to the boundary. Accordingly, the feature classifier 102 may be trained on feature space data in order to enable the feature classifier 102 to classify images.

In an exemplary embodiment, given labeled images $(x_1, y_1), \ldots, (x_n, y_n)$, $x_i$ may represent a feature vector of an image. $y_i \in \{-1, +1\}$ may be a label in which, $-1$ denotes irrelevant and $+1$ denotes relevant. Accordingly, training an SVM (e.g., the classification element 76) may lead to a quadratic optimization problem as shown below:

$$\min W(\alpha) = \min\left\{-\sum_{i=1}^{n} \alpha_i + \frac{1}{2}\sum_{i=1}^{n}\sum_{j=1}^{n} y_i y_j \alpha_i \alpha_j k(x_i, x_j)\right\}$$

subject to $$\sum_{i=1}^{n} y_i \alpha_i = 0$$

$$\forall i, 0 \le \alpha_i \le C$$

in which C is a constant and k is a kernel function. The boundary may be (w·x)+b=0, where $$w = \sum_{i=1}^{n} \alpha_i x_i y_i \text{ and } b = -\frac{1}{2} w \cdot [x_r + x_s]$$

in which $x_r$ and $x_s$ may be any support vector satisfying $\alpha_r$, $\alpha_s \ge 0$, $y_r = 1$, $y_s = -1$.

The selection element 104 may be any device or means embodied in either hardware, software, or a combination of hardware and software that is capable of selecting one or more images to form the subset of images 88 based on the determinations made by the feature classifier 102. In other words, the selection element 104 samples the images based on multiple features to select relatively more informative images for further refinement. In this regard, the selection element 104 may be configured to select an image to be a member of the subset of images 88 if the image includes a first relevance determination with respect to a first feature the of image and a second relevance determination for at least a second feature of the image. For example, if the color of the image is determined to be relevant and the texture of the image is determined to be irrelevant, the image may be selected to be a member of the subset of images 88. Accordingly, the selected images forming the subset of images 88 represent images near the classification boundary 84, for which image feedback 80 would be more useful in further clarifying the classification boundary 84.

As stated above, the user may provide image feedback 80 for as many or as few images as the user desires in either or both of the first portion 90 and the second portion 92. However, generally speaking, feedback received in association with images in the first portion 90 may not be as useful as feedback received in association with images in the second portion 92. Accordingly, it may be possible for the user to receive better classification by providing image feedback 80 in association with images from the subset of images 88. Furthermore, the user may receive better classification with a reduced amount of relevance feedback since the image feedback 80 may be provided in association with images more likely to provide useful information (e.g., images of the subset of images 88). Thus, a user's experience may be enhanced since improved results may be achieved with less effort.

It should also be noted that image feedback may be input and/or relevant images may be provided in a repetitive manner until the desired results have been achieved (e.g., until the user is satisfied with the results). In other words, the user may select provide the query 78 to the classification element 76 via the user interface element 72. The classification element 76 may present relevant images to the user based on a similarity measure, via the user interface element 72. The classification element 76 may also select images to form the subset of images 88 and present the selected images to the user for further classification. The user may provide the classification element 76 with the image feedback 80 for at least some of the images of the subset of images 88 (and possibly other images as well) via the user interface element 72. The classification element 76 may re-determine or update the classification boundary 84 (e.g., by running an updated classification algorithm) based on the image feedback 80 and re-present relevant images based on the updated classification. The classification element 76 may also provide another subset of images 88 based on the updated classification and the sequence above may be repeated until the user is satisfied with the results.

Figure 7:
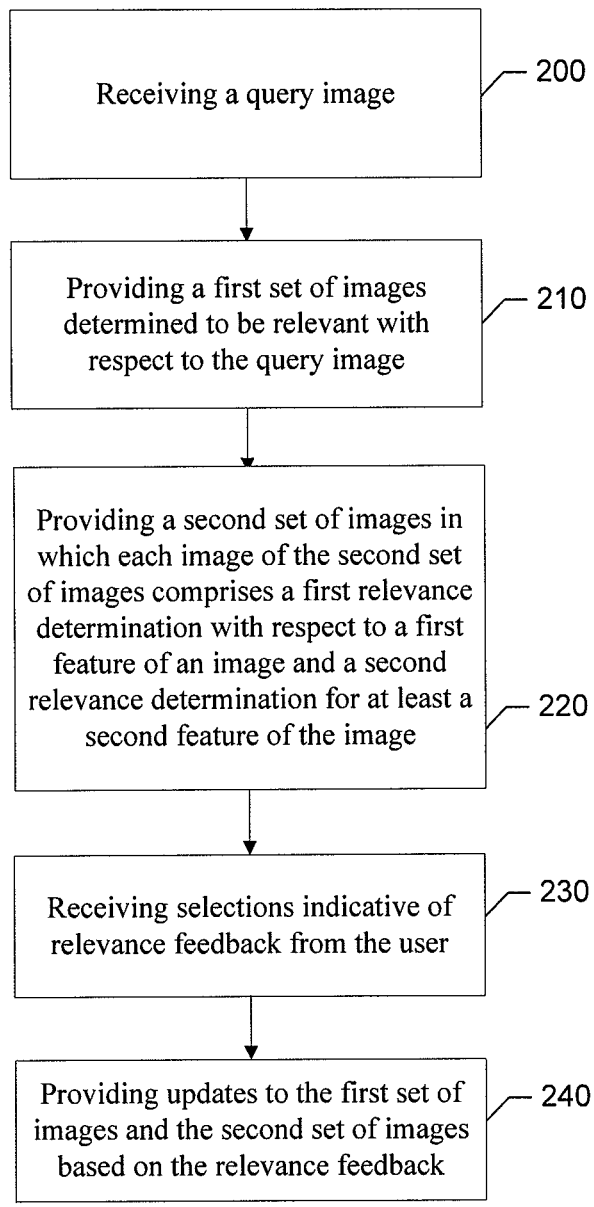
FIG. 7 is a flowchart according to an exemplary method for providing multi-feature based sampling for relevance feedback according to an exemplary embodiment of the present invention.

FIG. 7 is a flowchart of a system, method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal and executed by a built-in processor in a mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method of providing multiple feature based sampling for relevance feedback may include receiving a query image at operation 200 and providing a first set of images determined to be relevant with respect to the query image at operation 210. The method may further include providing a second set of images in which each image of the second set of images comprises a first relevance determination with respect to a first feature of an image and a second relevance determination for at least a second feature of the image at operation 220. Each image of at least the second set of images includes an associated user interface item to enable a user to provide relevance feedback with respect to each image of the second set of images. In an exemplary embodiment, the method may further include receiving selections indicative of relevance feedback from the user at operation 230. In yet another exemplary embodiment, the method may include providing updates to the first set of images and the second set of images based on the relevance feedback at operation 240.

Accordingly, unlike conventional relevance feedback methods which combines feedback into one feature space (i.e., extract only one feature vector for each image), embodiments of the present invention are directed to extracting multiple features separately and making a determination with regard to relevance for each separate extracted feature. A subset of images having a first feature with a first relevance determination and a second feature having a second relevance determination may then be provided to the user so that the user may select at least some images for providing feedback from the subset of images. The subset of images may represent images close to the classification boundary, which would be more useful in providing relevance feedback for relearning or refining of the classification boundary using, for example, an SVM.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   extracting a feature vector from each image of a set of images;
   receiving a query image;
   determining a plurality of classification boundaries in feature space by determining a classification boundary for each feature based on the query image and the extracted feature vectors;
   providing, via a processor, a first set of images determined to be relevant with respect to the query image, responsive to a determination of a proximity of the extracted image features being with the respective classification boundaries;
   providing, via a processor, a second set of images in which each image of the second set of images is selected due to having a first feature of the extracted feature vector of an image determined to be relevant with respect to the query image and a second feature of the extracted feature vector of the image determined to be irrelevant with respect to the query image, responsive to a determination of the first feature being within the classification boundary associated with the first feature and the second feature being outside the classification boundary associated with the second feature;
   receiving relevance feedback with respect to at least one image of the second set of images, the relevance feedback indicating a degree to which the at least one image of the second set of images is relevant to the query image;
   updating the classification boundaries in response to the relevance feedback; and
   providing updates to the first set of images and the second set of images, responsive to a determination of a proximity of image features to the updated classification boundaries.

2. A method according to claim 1, wherein the relevance feedback comprises selections indicative of relevance.

3. A method according to claim 2, further comprising providing updates to the first set of images and the second set of images based on the relevance feedback.

4. A method according to claim 1, wherein providing the first set of images comprises providing at least one image from among a plurality of images in which the at least one image is determined to be relevant based on a proximity of the at least one image to a classification boundary in feature space.

5. A method according to claim 1, wherein providing the first set of images comprises providing the first set of images in which each image of the first set of images includes an associated user interface item to enable the user to provide relevance feedback with respect to each image of the first set of images.

6. A method according to claim 1, wherein providing the first set of images and providing the second set of images comprises communicating the first and second sets of images to a display for presentation to the user.

7. A computer program product comprising at least one non-transitory computer-readable storage medium having computer-readable program code portions stored therein, the computer-readable program code portions being configured to, upon execution, cause an apparatus to:
   extract a feature vector from each image of a set of images;
   receive a query image;
   determine a plurality of classification boundaries in feature space by determining a classification boundary for each feature based on the query image and the extracted feature vectors;
   provide a first set of images determined to be relevant with respect to the query image, responsive to a determination of a proximity of the extracted image features being with the respective classification boundaries;
   provide a second set of images in which each image of the second set of images is selected due to having a first feature of the extracted feature vector of an image determined to be relevant with respect to the query image and a second feature of the extracted feature vector of the image determined to be irrelevant with respect to the query image, responsive to a determination of the first feature being within the classification boundary associated with the first feature and the second feature being outside the classification boundary associated with the second feature;
   receive relevance feedback with respect to at least one image of the second set of images, the relevance feedback indicating a degree to which the at least one image of the second set of images is relevant to the query image;
   update the classification boundaries in response to the relevance feedback; and provide updates to the first set of images and the second set of images, responsive to a determination of a proximity of image features to the updated classification boundaries.

8. A computer program product according to claim 7, wherein the relevance feedback comprises selections indicative of relevance.

9. A computer program product according to claim 8, further comprising a fifth executable portion for providing updates to the first set of images and the second set of images based on the relevance feedback.

10. A computer program product according to claim 7, wherein the second executable portion includes instructions for providing at least one image from among a plurality of images in which the at least one image is determined to be relevant based on a proximity of the at least one image to a classification boundary in feature space.

11. A computer program product according to claim 7, wherein the second executable portion includes instructions for providing the first set of images in which each image of the first set of images includes an associated user interface item to enable the user to provide relevance feedback with respect to each image of the first set of images.

12. A computer program product according to claim 7, wherein the first and second executable portions each include instructions for communicating the first and second sets of images, respectively, to a display for presentation to the user.

13. An apparatus comprising a processor and memory including computer program code, the memory and computer program code configured to, with the processor, cause the apparatus to:
  extract a feature vector from each image of a set of images;
  receive a query image;
  determine a plurality of classification boundaries in feature space by determining a classification boundary for each feature based on the query image and the extracted feature vectors;
  provide a first set of images determined to be relevant with respect to the query image, responsive to a determination of a proximity of the extracted image features being with the respective classification boundaries;
  provide a second set of images in which each image of the second set of images is selected due to having a first feature of the extracted feature vector of an image determined to be relevant with respect to the query image and a second feature of the extracted feature vector of the image determined to be irrelevant with respect to the query image, responsive to a determination of the first feature being within the classification boundary associated with the first feature and the second feature being outside the classification boundary associated with the second feature;
  receiving relevance feedback with respect to at least one image of the second set of images, the relevance feedback indicating a degree to which the at least one image of the second set of images is relevant with respect to the query image;
  update the classification boundaries in response to the relevance feedback; and
  provide updates to the first set of images and the second set of images, responsive to a determination of a proximity of image features to the updated classification boundaries.

14. An apparatus according to claim 13, wherein the relevance feedback comprises selections indicative of relevance.

15. An apparatus according to claim 14, wherein the memory and computer program code are further configured to, with the processor, cause the apparatus to provide updates to the first set of images and the second set of images based on the relevance feedback.

16. An apparatus according to claim 13, wherein the memory and computer program code are further configured to, with the processor, cause the apparatus to provide at least one image from among a plurality of images in which the at least one image is determined to be relevant based on a proximity of the at least one image to a classification boundary in feature space.

17. An apparatus according to claim 13, wherein the memory and computer program code are further configured to, with the processor, cause the apparatus to provide the first set of images in which each image of the first set of images includes an associated user interface item to enable the user to provide relevance feedback with respect to each image of the first set of images.

18. An apparatus according to claim 13, wherein the memory and computer program code are further configured to, with the processor, cause the apparatus to communicate the first and second sets of images to a display for presentation to the user.

19. An apparatus according to claim 13, wherein the memory and computer program code are further configured to, with the processor, cause the apparatus to extract a feature vector corresponding to at least one feature from each image for use in performing relevance determinations.

20. An apparatus according to claim 13, wherein the memory and computer program code are further configured to, with the processor, cause the apparatus to classify images as relevant or irrelevant for a given feature based on the feature vector.

21. An apparatus according to claim 20, wherein the memory and computer program code are further configured to, with the processor, cause the apparatus to select an image to be a member of the second set of images based on image classifications performed at the classification element.

22. An apparatus according to claim 13, wherein the apparatus is embodied as a mobile terminal.

23. An apparatus comprising:
  means for extracting a feature vector from each image of a set of images;
  means for receiving a query image;
  means for determining a plurality of classification boundaries in feature space by determining a classification boundary for each feature based on the query image and the extracted feature vectors;
  means for providing a first set of images determined to be relevant with respect to the query image, responsive to a determination of a proximity of the extracted image features being with the respective classification boundaries;
  means for providing a second set of images in which each image of the second set of images is selected due to having a first feature of the extracted feature vector of an image determined to be relevant with respect to the query image and a second feature of the extracted feature vector of the image determined to be irrelevant with respect to the query image, responsive to a determination of the first feature being within the classification boundary associated with the first feature and the second feature being outside the classification boundary associated with the second feature;
  means for receiving relevance feedback with respect to at least one image of the second set of images, the relevance feedback indicating a degree to which the at least one image of the second set of images is relevant to the query image;

means for updating the classification boundaries in response to the relevance feedback; and means for providing updates to the first set of images and the second set of images, responsive to a determination of a proximity of image features to the updated classification boundaries.

24. An apparatus according to claim 23, wherein the relevance feedback comprises selections indicative of relevance.

\* \* \* \* \*